United States Patent
Jones (10) Patent No.: US 10,928,795 B2
(45) Date of Patent: Feb. 23, 2021

(54) SYSTEM FOR CONTROLLING A PLURALITY OF POWER-CONSUMING DEVICES

(71) Applicant: Shields Energy Services Limited, Leigh-On-Sea Essex (GB)

(72) Inventor: Christopher Jones, Leigh-On-Sea Essex (GB)

(73) Assignee: Shields Energy Services Limited, Essex (GB)

( * ) Notice: Subject to any disclaimer, the term of this patent is extended or adjusted under 35 U.S.C. 154(b) by 0 days.

(21) Appl. No.: 16/074,708

(22) PCT Filed: Feb. 1, 2017

(86) PCT No.: PCT/GB2017/050243
§ 371 (c)(1),
(2) Date: Aug. 1, 2018

(87) PCT Pub. No.: WO2017/134427
PCT Pub. Date: Aug. 10, 2017

(65) Prior Publication Data
US 2019/0041820 A1    Feb. 7, 2019

(30) Foreign Application Priority Data
Feb. 1, 2016    (GB) .................................... 1601768

(51) Int. Cl.
*G05B 19/042*    (2006.01)
*G05B 15/02*    (2006.01)
(Continued)

(52) U.S. Cl.
CPC ......... *G05B 19/0423* (2013.01); *G05B 15/02* (2013.01); *G05B 2219/21049* (2013.01);
(Continued)

(58) Field of Classification Search
CPC ................ G05B 15/02; G05B 19/0423; G05B 2219/21049; G05B 2219/2642; H04L 12/66; H04W 84/12
See application file for complete search history.

(56) References Cited

U.S. PATENT DOCUMENTS

2008/0183337 A1* 7/2008 Szabados ........... H05B 37/0254
700/296
2012/0324097 A1* 12/2012 Myers .................. G06F 11/3433
709/224

(Continued)

FOREIGN PATENT DOCUMENTS

WO    WO 2015/049412 A1    4/2015

OTHER PUBLICATIONS

International Search Report dated May 11, 2017 (3 pages—English language) out of PCT Priority Application PCT/GB2017/050203.

(Continued)

*Primary Examiner* — Chad G Erdman
(74) *Attorney, Agent, or Firm* — Brinks Gilson & Lione; John C. Freeman (57) ABSTRACT

A system for controlling a plurality of power consuming devices is disclosed including a plurality of nodes, a gateway that communicates with the plurality of nodes, and a controller configured to send command signals to the nodes via the gateway. The controller associates each node with a region, each region representing a physical area and having a target profile associated therewith. The controller includes a command signal generation unit that determines command signals for a node based on the associated target profile, each node providing control signals to a corresponding power consuming device in response to a command signal received from the controller.

8 Claims, 5 Drawing Sheets

(51) Int. Cl.
*H04L 12/66* (2006.01)
*H04W 84/12* (2009.01)

(52) U.S. Cl.
CPC ...... *G05B 2219/2642* (2013.01); *H04L 12/66* (2013.01); *H04W 84/12* (2013.01)

(56) References Cited

U.S. PATENT DOCUMENTS

| | | | |
|---|---|---|---|
| 2014/0005809 A1* | 1/2014 | Frei | G06F 13/10 |
| | | | 700/90 |
| 2015/0005909 A1* | 1/2015 | Monma | H04L 12/2825 |
| | | | 700/90 |
| 2015/0280936 A1* | 10/2015 | Bishop | H04L 12/2823 |
| | | | 700/275 |
| 2016/0242264 A1 | 8/2016 | Pakkala et al. | |
| 2017/0033944 A1* | 2/2017 | Nadathur | H04L 41/0695 |
| 2017/0230916 A1* | 8/2017 | Stein | H02J 50/20 |
| 2017/0285715 A1* | 10/2017 | Tsuji | H04Q 9/00 |

OTHER PUBLICATIONS

Written Opinion dated May 11, 2017 (pages—English language) out of PCT Priority Application PCT/GB2017/050203.

\* cited by examiner

SYSTEM FOR CONTROLLING A PLURALITY OF POWER-CONSUMING DEVICES

This application is a national application of International Application No. PCT/GB2017/050243 filed Feb. 1, 2017 pursuant to 35 U.S.C. § 363, wherein this application claims pursuant to 35 U.S.C. § 119(b) the benefit of the filing date of Feb. 1, 2016 of Great Britain Patent Application No. 1601768.3, the entire contents of each are incorporated herein by reference.

FIELD OF THE INVENTION

The present invention relates to a system for controlling a plurality of power consuming devices.

BACKGROUND AND PRIOR ART

There is an ongoing need to reduce energy consumption. One approach is the use of a building energy management system, in which a central system controls the operation of power consuming devices in the building according to defined criteria.

When installed into an existing building, retrofitting the required communications cabling can be costly. Alternative communication systems include power line communications (PLC) and wireless networking. PLC systems are usually low bandwidth; low power wireless communication systems such as those based on IEEE 802.15.4 (eg Zigbee™) deploy mesh network topologies to increase their working range at the cost of increased latency. Low bandwidth and/or high latency presents challenges for control systems that require live operating data such as device status, power consumption, etc.

Local users typically require the ability to override the central system. Managers at such sites often also require this ability in response to ad-hoc events such as unscheduled maintenance. Where several buildings are managed the control logic at each site tends to drift further from the original control logic over time. Benchmarking energy saving performance, eg between buildings, then becomes difficult as the control logic used may no longer be comparable.

In buildings where there are many devices to be controlled the control logic becomes cumbersome to maintain and update.

The present invention seeks to address at least some of the challenges with existing energy management systems, or to present a useful alternative.

SUMMARY OF THE INVENTION

In accordance with a first aspect of the invention there is provided a system for controlling a plurality of power consuming devices, comprising:
 a plurality of nodes;
 a gateway that communicates with the plurality of nodes;
 a controller configured to send command signals to said nodes via said gateway;
 wherein the controller associates each node with a region, each region representing a physical area and having a target profile associated therewith, controller including a command signal generation unit that determines command signals for a node based on the associated target profile, each node providing control signals to a corresponding power consuming device in response to a command signal received from the controller.

Preferably, the gateway receives status data from said nodes, the gateway buffering data from the nodes.

Preferably, one of the command signals is a request for node status data, the gateway configured to respond to the command signal using the buffered data, the command signal generation unit determining command signals for a node based on that node's status data.

Preferably, the gateway polls each node to request status data, the gateway configured to update the buffered data to indicate a node is offline if no status data is received from that node within a timeout period.

Preferably, each node is configured to transmit status data to the gateway in response to a change in a measured parameter.

Preferably, each node includes a power switch having an on state and an off state, wherein the state of the power switch is included in the status data.

Preferably, each node measures power used by the power consuming device, wherein power usage data is included in the status data.

Preferably, each node includes a fault event detector that causes the node to produce control signals in response to a default state command whenever the fault event detector determines a fault event has occurred.

Preferably, the fault event detector determines a fault event has occurred in response to a power failure to the node or a communication failure to the gateway.

Preferably, the default state command corresponds with 100% power to the power consuming device.

Preferably, at least one node includes a presence detection sensor providing presence data to the node, said presence data being included in the status data.

Preferably, at least one node is integral with its corresponding power consuming device.

Preferably, at least one power consuming device is a luminaire.

Preferably, the system includes at least one sensor measuring at least one physical parameter, wherein the controller is configured to receive measurement data from said at least one sensor.

Preferably, the controller associates at least one sensor with at least one region, the command signal generation unit determining command signals for a node based on measurement data from each sensor associated with the region with which that node is associated.

Preferably, a target profile represents power usage.

Preferably, a target profile represents light output, and at least one sensor in that region includes a lux sensor.

Preferably, a target profile is temperature, and at least one sensor in that region includes a temperature sensor.

Preferably, the command signal generation unit includes a rules engine.

Preferably, the system further comprises a data warehouse configured to request status data and measurement data from the controller and to store said status data and measurement in the warehouse.

Preferably, the data warehouse receives external data relating to a region.

Preferably, the data warehouse includes at least one preferred controller configuration including rules data used by the rules engine; each controller being associated with one of the preferred configurations in the data warehouse.

Preferably, the system further comprises a central processor that requests current configuration data from each controller.

Preferably, each controller is associated with a site identifier in the data warehouse.

Preferably, the central processor is configured to compare data in the data warehouse between controllers and sites.

Preferably, the central processor compares each controller's current rules data against preferred configuration data.

Preferably, the central processor compares power usage against rules data.

Preferably, the central processor produces a new preferred configuration which includes a current rule from a controller associated with that configuration and stores the new preferred configuration in the data warehouse.

Preferably, the central processor communicates the preferred configuration to each controller associated with that configuration along with a command to replace the controller's current configuration data with the preferred configuration data.

Preferably, the central processor includes a further command generator having a further rules engine, said central processor arranged to communicate commands produced by the further command generator to at least one controller.

BRIEF DESCRIPTION OF THE FIGURES

The invention will now be described with reference to the accompanying drawings, in which.

DESCRIPTION OF PREFERRED EMBODIMENTS

Figure 1:
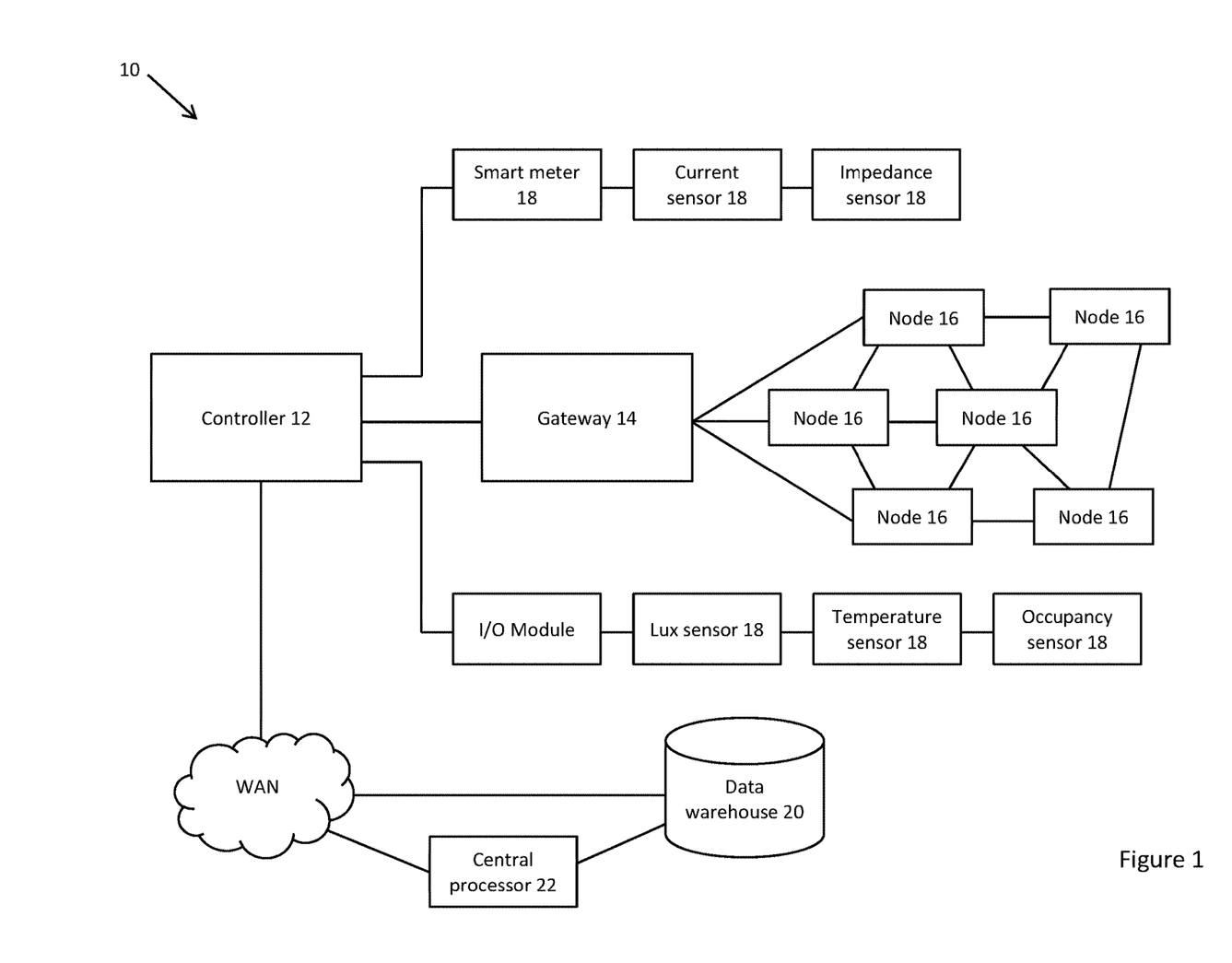
FIG. 1 shows a system according to an embodiment of the invention.

FIG. 1 shows a system 10 for controlling a plurality of power consuming devices comprising a controller 12, a gateway 14 and nodes 16. Each node 16 has a corresponding power consuming device (not shown) to which the node 16 provides control signals as will be described in more detail below.

Figure 2:
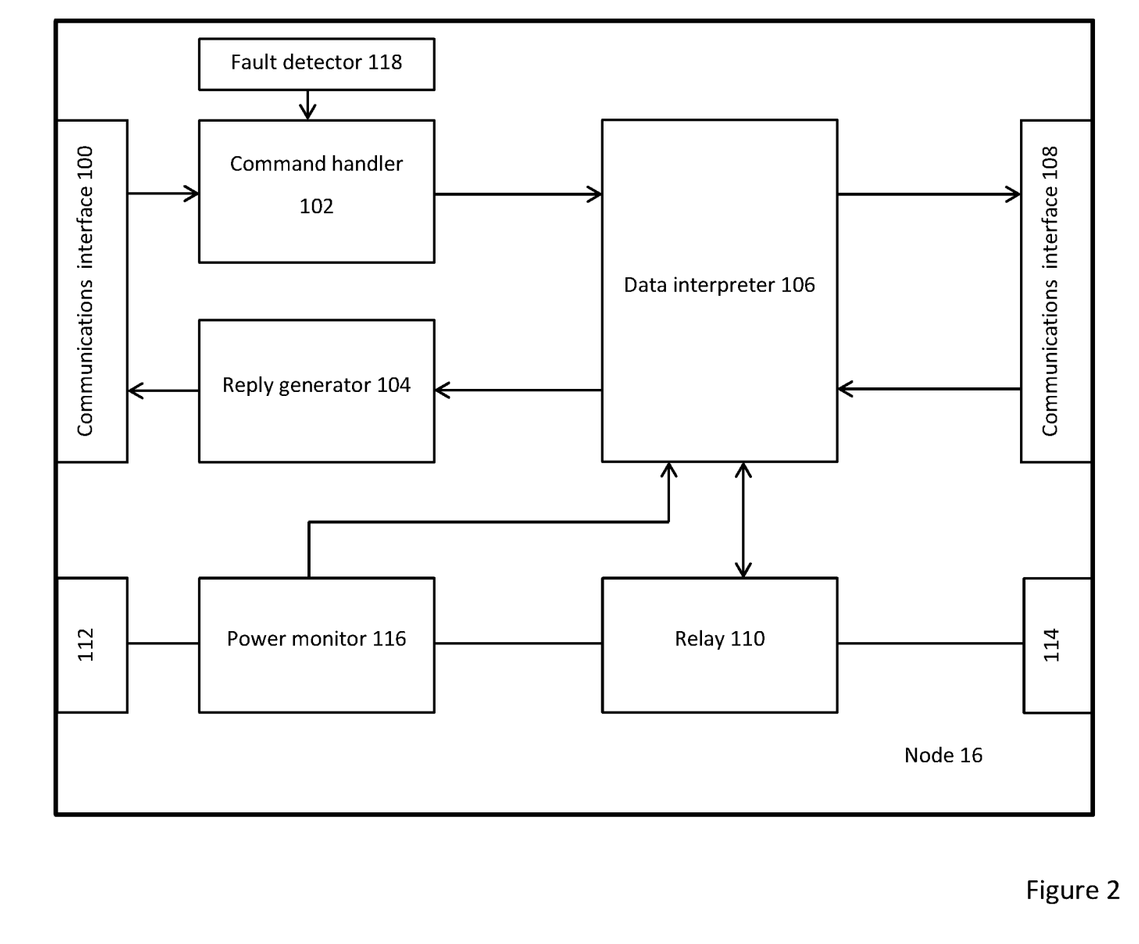
FIG. 2 is a functional block diagram of a node in the system of FIG. 1.

Referring now to FIG. 2, a functional block diagram of a node 16 is shown. The node 16 comprises a communications interface 100, a command handler 102 and a reply generator 104. The communications interface 100 receives command signals from the controller 12 via the gateway 14 and sends status data from the reply generator 104 to the gateway 14. In the embodiment the interface 100 comprises an IEEE 802.15.4 interface such as ZigBee™. Whilst other interfaces can be used with the invention, this interface is preferred because its wireless mesh networking capability assists with retrofit installations.

The command handler 102 receives commands from the communications interface 100 and processes the commands. Commands may include an instruction to alter the state of an attached power consuming device, in which case the command is passed to a data interpreter 106.

If the command is a request for status data, the command handler 102 passes the command to the reply generator 104 which reads status data from the data interpreter 106 and communicates the status data to the communications interface 100 for transmission to the gateway 14.

The data interpreter 106 translates the commands containing a change of state for the device into corresponding I/O signal values and passes these to an I/O interface 108. The I/O interface 108 produces control signals which are sent to the power consuming device to which the node 16 is connected. It is preferred that the I/O interface 108 includes multiple signal interfaces, including a 0 to 10 V control signal and a digital addressable lighting interface (DALI) interface. For example, a command to reduce power to 50% output may be translated to a value of 5V on a 0-10V control output. Other interfaces may be used according to the nature of the power consuming device.

The I/O interface 108 also includes a sensor input for receiving status data from a sensor. The sensor may be integrated in the power consuming device or it may be a separate sensor. Where the power consuming device is a luminaire, it is preferred that the sensor is a presence detector.

The node 16 further comprises a power switch in the form of a relay 110 configured to switch A/C power from a power input 112 to a power output 114. In the embodiment, the power consuming device is attached to the power output 114. A power monitor 116 measures the power consumption of the device attached to the power output 114.

The relay 110 operates under control from the data interpreter 106. Commands may be sent by the controller 12 to the node 106 to instruct the node to open or close the relay 110. The state of the relay 110, such as open/close or on/off, is included in the status data for the node 16 sent to the gateway 14.

The data interpreter 106 receives sensor data from a sensor attached to the interface 108 and power consumption data from the power monitor 106. In addition, the data interpreter 106 reads the current value of the control signals from the I/O interface 108. Collectively, these form status data at the node 16 which is sent to the gateway 14 by the reply generator 104.

The node 16 further includes a fault detector 118 configured to send commands to the command handler 102 when it detects the presence of a fault. The fault detector 118 detects whether power to the node 16 has been interrupted, such as by a brown-out or black-out detection circuit, or whether a communications fault has occurred based on an elapsed time since a command signal was received from the interface 100. If either of these fault conditions is detected, the fault detector 118 sends a command to the command handler 102. In one embodiment, the fault detector 118 sends a command to the command handler 102 to switch the power consuming device to 100% output; in an alternative arrangement the fault detector 118 is configured to switch the device to 0% output. The choice of which configuration to use will be determined by the nature of the power-consuming device. For instance in the situation where the device is a luminaire, the fault detector 118 is preferably configured to switch the device to full output power to ensure there is adequate lighting for safety. Alternatively, if the device is for instance a heating element, it may be preferable to have the device initially switched to 0% power in the event of a fault.

While the node 16 has been described as being a separate device from the power consuming device, in other embodiments the node may be integral with the power consuming device.

In some embodiments the data interpreter 106 may be configured to "push" status data from one or more sources. A preferred example occurs where the data interpreter 106 is configured to push status data whenever sensor data from an attached sensor changes state.

Figure 3:
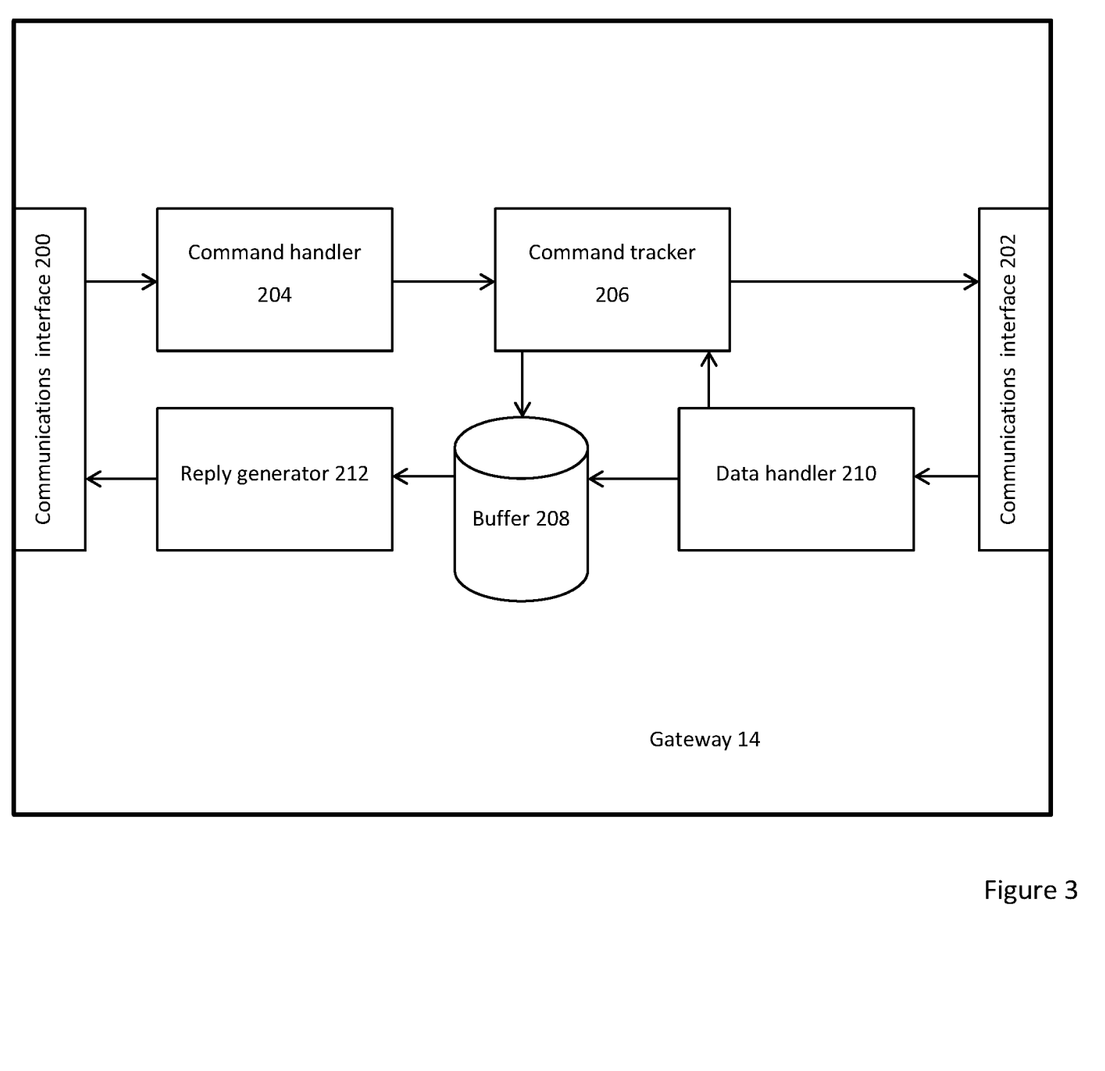
FIG. 3 is a functional block diagram of a gateway in the system of FIG. 1.

Referring now to FIG. 3, there is shown a functional block diagram of the gateway 14. The gateway 14 comprises a first communication interface 200 in communication with the controller 12 and a second communication interface 202 in communication with nodes 16. An outbound command handler 204 receives command signals from the controller 12 via the interface 200. A command tracker 206 receives commands from the outbound command handler 204 and forwards the commands to the second interface 202 for transmission to the node identified in the command signal. The command tracker 206 monitors the time elapsed since a command signal was transmitted to a node and, in the absence of an response within a predefined time period, records the node as being off-line in a data buffer 208.

An inbound data handler 210 receives status data from nodes 16 via the interface 202. The data handler 210 notifies the command tracker 206 of receipt of data from a node so that the command tracker 206 can update its record of time elapsed since command signals were transmitted to a node and update the online/offline status of the node in the buffer 208 as necessary. The data handler 210 is further configured to store status data received from each node 16 in the data buffer 208. Thus the gateway 14 stores in the data buffer 208 status data from all notes 16 with which it communicates. As new status data is received, the buffer 208 is updated accordingly.

In the embodiment, the command tracker 206 of the gateway 14 is configured to poll each node 16 periodically, which may range from several times per second to every few seconds according to the application, to request status data therefrom. The command tracker 206 then tracks whether responses are received by the data handler 210 from each node within a predefined response period, and stores this information in the buffer 208. In this manner the gateway 14 maintains a record in the buffer 208 of which nodes are online and off-line together with the most recent status data received from each node.

The gateway 14 further comprises a reply generator 212 which is configured to transmit status data to the controller 12 via the interface 200. The reply generator 212 obtains status data for a node from the buffer 208 rather than requesting it from the node to reduce the amount of traffic transmitted over the interface 202 and to ensure status data is always available for transmission to the controller 12. The command handler 204 is configured to intercept command signals from the controller 12 requesting status data from a node and pass them to the reply generator 212 rather than to the command tracker 206. Thus, requests from the controller 12 for status data are handled by the gateway 14 and are not communicated to nodes 16, while other commands from the controller 12 are passed to the command tracker 206 for communication to nodes 16. In embodiments where the communication between the gateway 14 and nodes 16 is via a wireless mesh-based networking the buffer arrangement of the gateway 14 enables status data to be provided in a timely manner to the controller 12 irrespective of any latency or offline status of a node due to the mesh nature of the networking.

Figure 4:
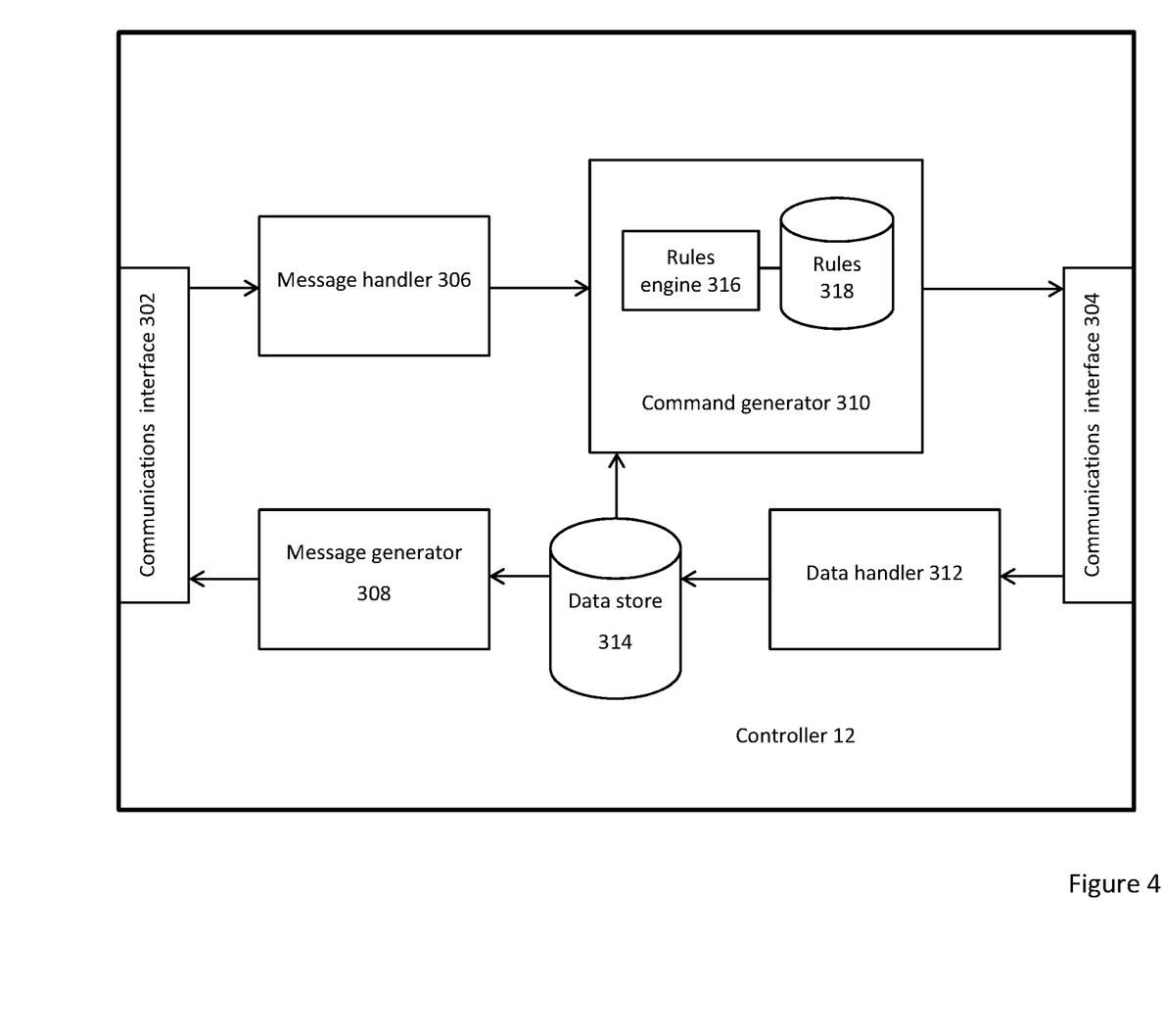
FIG. 4 is a functional block diagram of a controller in the system of FIG. 1.

Referring now to FIG. 4 there are shown a functional block diagram of the controller 12. The controller 12 includes a first communications interface 302 and a second communication interface 304. The second communication interface 304 communicates with the gateway 14. The controller further comprises a message handler 306 and a message generator 308, a command generator 310 and a data handler 312. A data store 314 is provided in the controller 12.

The message handler 306 receives and interprets commands from a central processor as will be described hereinafter. The message generator 308 provides data to the central processor in response to commands received therefrom, and in some embodiments is arranged to push data to a data warehouse periodically such as every 5 minutes. The message generator 308 obtains such data from the data store 314. The data store 314 of the embodiment has sufficient capacity to store five days of data to provide redundancy in the event of communication loss with the central processor or a data warehouse.

The command generator 310 includes a rules engine 316 which operates on a store of command rules 318 to generate commands to send to nodes. The command generator 310 sends commands to the second interface 304 for communication to nodes via the gateway 14. Each command includes a node address. One such command includes a request for status data from a node.

In some embodiments the controller includes an interface such as a switch (not shown) to enable local override of rules engine 316, typically for fixed time such as 45 mins although other time periods may be used. This provides a convenient override where necessary eg for local maintenance. In one implementation, such overrides are stored as high priority rules in the rule store 318, whereby higher priority rules take precedence over lower priority rules. When a local override is activated, the controller 12 may push notification of the override to the data warehouse 20. In some arrangements, the controller 12 may also push status data related to the override to the data warehouse; for example if the override relates to turning lights on, the controller 12 may also push lux measurement data to the warehouse. In some embodiments, the switches that provide an override signal to the controller 12 may be associated with a region, as described below, in which case the controller is configured to send commands to all nodes associated with that region in response so the override signal. In the case of maintenance, such commands would most commonly be to remove power to the power consuming devices by opening the relay in each node.

In some embodiments, the controller 12 may be responsive to override signals from other devices such as a fire alarm or intruder alarm. The rule store 318 may include automatic override rules triggered by a remote alarm system via an i/o interface. For instance, in the event of a fire alarm activating, an override rule may turn all lights on. An other example would be turning lights on in the regions where an impedance sensor has exceeded a threshold value to deter earth (ground) cable theft. In the event of an intruder alarm activating, an override rule may again turn all lights on, which may improve the quality of surveillance video such as CCTV.

A manager may be provided with permission to modify and create rules in the rule store 318. The controller may keep a checksum in the rule store 318 which is incremented whenever a rule is created, modified or deleted, whereby the controller is configured to include the checksum when sending data to data warehouse or central processor. Including the checksum allows identification of rule changes by the central processor, and synchronisation of rules either from controller to data warehouse or from the data warehouse to the controller according to commands from the central processor. Such rule synchronisation may be across all controllers within a site, controllers in all sites within a region, or to all controllers on sites associated with an organisation. This arrangement provides a degree of flexibility while also allowing convenient synchronisation of rules for performance analysis.

The data handler 312 receives status data from the gateway 14 via the interface 304 and stores this data in the data store 314. The data store further includes: region data defining at least one region, each region representing a physical area; target profile data defining a desired operating profile; device data defining operating characteristics of devices, and sensor data storing data received from sensors 18. In a similar manner to that described above for the node 16, the interface 304 may provide multiple external interfaces such as Ethernet and RS 485.

Examples of sensors 18 are shown in FIG. 1, including a lux sensor, a temperature sensor, and occupancy detector, a impedance or resistance meter, a power measuring sensor which may be a current monitor or a smart meter. Other forms of sensors are envisaged depending upon the application of the system. The sensors may be attached to a node 16 or they may be independently provided within a region and in communication with the controller 12 via the interface 304. One form of sensor may be an I/O interface to other systems, such as an alarm system whereby the state of the alarm forms sensor data for the controller. Interfacing to other systems enables the controller to respond to external events, for instance in the event of an intruder alarm to issue commands to turn all lights to 100%. Where an alarm system has multiple sensors, eg door sensors and motion sensor in rooms, these may be associated with regions so that the controller may be provided with rules to turn on lighting within that region in response to an alarm.

The data store 314 also includes data associating each node with a region, each power-consuming device with a device data profile, each node with a device and each region with a target profile. The rules engine 316 utilises data in the data store 314 and association data along with rules 318 to generate commands. In one arrangement, the command generator 310 compares sensor data received from a node against the associated target profile for the region associated with the node to generate commands. For example if the sensor data included a lux sensor and the target profile included a desired illumination for a region, the command generator 310 compares the sensor data measuring the illumination in the region with the target profile and issues commands to increase or decrease the light output of luminaires attached to nodes to maintain the target profile. In one embodiment, the controller 12 is configured with rules that operate when the controller 12 issues commands to turn on or turn off the nodes in a region. For instance, the rules may review power consumption associated with that region prior to and after issuing the commands; if power consumption does not increase by a preconfigured minimum target an the controller 12 may issue an alert to advise the power consuming devices associated with that zone may not be operational. Additionally, the controller 12 may verify the state of each node's relay in the zone is in an expected state according to the commands sent, and issue and alert should the relay states not be correct.

In generating command signals, the command generated 310 also takes into account device data for the device attached to the node. For instance, a mercury vapour lamp may have a minimum time delay between turning off the lamp and turning it back on to allow a cooldown period.

Some of the power consuming devices may be heaters, one sensor may be a temperature sensor, and a target profile in the data store 314 for a region may represent a desired temperature profile. In this arrangement, the system enables control of heating.

Multiple regions may be defined which represent the same or overlapping physical areas to enable the system 10 to control multiple physical parameters such as light and temperature.

Within each region it is preferred that at least one occupancy detector is provided. Sensor data from the occupancy detector in combination with the rules engine 316 enables the controller 12 to vary the operation of power consuming devices according to whether people are present in the region. This allows for more efficient use of energy by the system 10.

The system 10 shown in FIG. 1 includes a single controller 12 and gateway 14 for clarity in the drawing. However, multiple controllers 12 each of which may have one or more gateways 14 are possible configurations of the system. Further, controllers 12 may be provided at multiple physical locations, called sites, so that the system may provide control across a number of physical locations.

The system 10 further includes a data warehouse 20 as shown in FIG. 1 with which the controller 12 is in communication via a wide-area network such as the Internet. The message generator 308 of each controller 12 is arranged to transmit status data from nodes 16 and sensor data from sensors 18 to the data warehouse 20. The data warehouse may also receive external data relating to a physical location where a controller 12 is located. Examples of external data include climate data and utility supplier data. Data received from each controller 12 is stored in the data warehouse associated with that controller. The data warehouse 20 may be configured using any suitable architecture such as star schema according to the Kimball data warehouse methodology; other configurations and methodologies may also be used.

The data warehouse 20 also includes at least one preferred controller configuration including rules data used by the rules engine 316 along with a checksum corresponding to that rules configuration. Each controller 12 is associated with one of the preferred configurations in the data warehouse 20. Each controller is also associated with a site identifier in the data warehouse. Modifications to rules can be detected by comparing the checksum received from the controller with the checksum in the preferred controller configuration. Storing a preferred configuration in the data warehouse allows each controller to be returned to a known configuration by synchronisation of rules from the data warehouse to the controller.

A central processor 22 forms part of the system 10. The central processor requests configuration data from each controller 12. In response to the command request from the central processor or 22, the message handler 306 in each controller 12 is configured to communicate command rules 318, region data, target profile data and device data to the central process or 22 which stores this data in the data warehouse. In other implementations, the controller may send data directly to the data warehouse.

Figure 5:
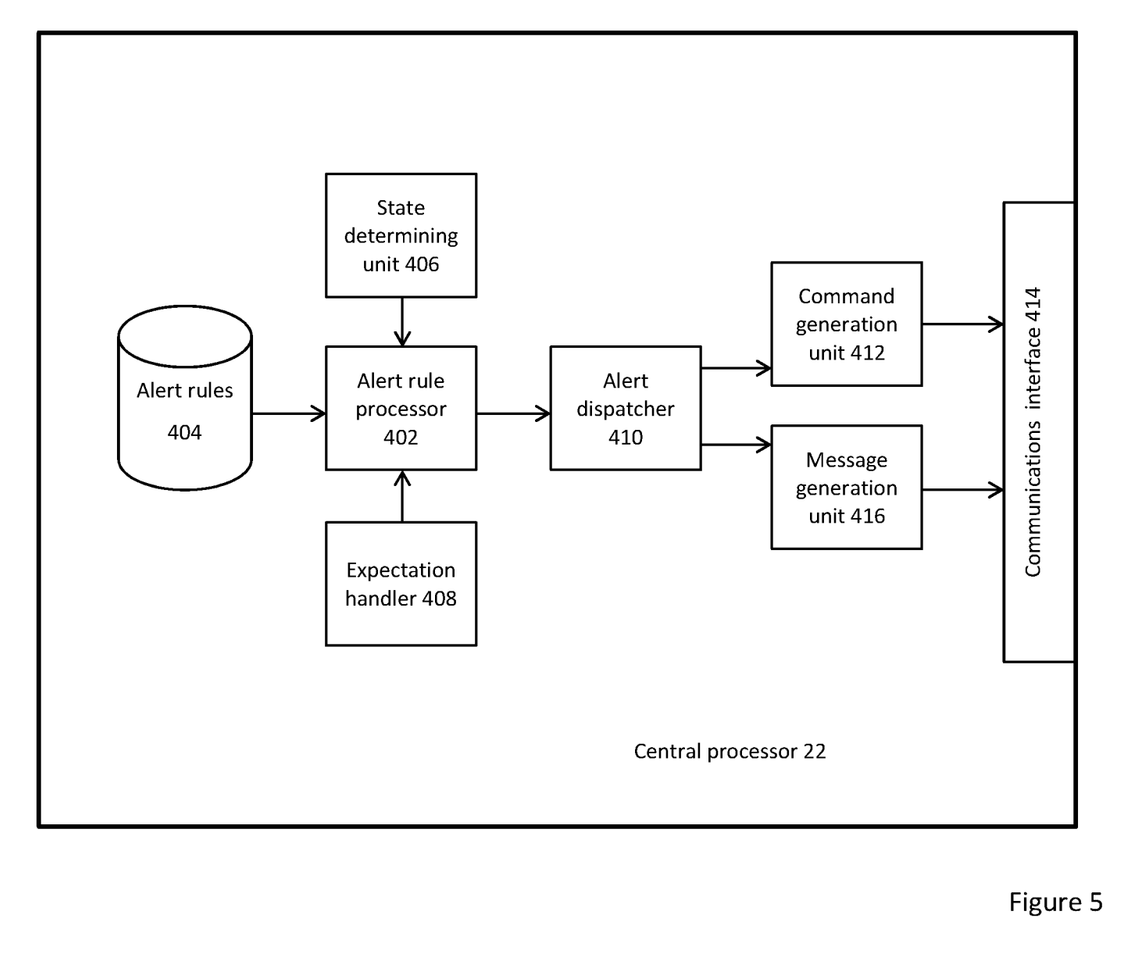
FIG. 5 is a functional block diagram of an alert system to be used with the central processor in the system of FIG. 1.

The central processor 22 includes an alert system which is shown in FIG. 5. The alert system includes an alert rule processor 402 configured to process a set of alert rules 404. The alert rule processor 402 identifies any data in the data warehouse matching the alert rule criteria.

A state determining unit 406 is provided to determine why a node output has a certain state, in particular which rule in the command rules 318 is responsible for the present state of the output. The alert rule processor 402 may request the state determining unit 406 to determine the rule responsible for the state of a node output and receives a response from the unit 406. In one arrangement the state determining unit is configured to return the highest priority rule currently applicable to the state of the output. This rule may not be the rule responsible for setting the status of the output, hence the determination may require analysing a data over a time window to make a determination. For instance, an hour ago a local user may have activated a local override to turn a light on. Half an hour later, the ambient light level may have dropped below a low light threshold, triggering a lower priority rule to turn the light on (which it already was, so no command may have been issued to the node). If the override was set to last 45 minutes, it would have expired so the override rule responsible for turning the light on is no longer responsible for the light's current on state.

An expectation handler 408 is also provided, which communicates with the alert rule processor 402 to indicate whether a future expectation defined in an alert rule has transpired. For example, an alert rule may indicate that 10 minutes after turning a light on, the lux reading in the region of the light will be above a predetermined value. In such a case, the alert rule processor 402 communicates the future expectation to the expectation handler 408. The handler 408 will determine whether the expected condition was met after the defined time and provide an indication to the alert rule processor 402. In some embodiments, the expectation handler 408 is also responsive to requests from users to provide indication why a node output has a given state. The indication may be provided via a user interface.

The alert rule processor 402 determines whether an alert is required based on the alert rule from the set of alert rules 404, data in the data warehouse 20, and if required also from the state determination unit 406 and/or expectation handler 408. If an alert is required, the processor 402 notifies an alert dispatcher 410.

The alert dispatcher 410 determines whether a command to a controller 12 is required in response to the alert. If a command is required, it is produced by the command generation unit 412 and sent to the controller 12 via a communications interface 414. Alternatively, or in addition, a message to an actor is required in response to the alert. In this case, the message is produced by the message generation unit 416 and sent via the communications interface 414. In some implementations, multiple messages may be issued in response to an alter to the same or multiple actors. Whether to issue command(s) and/or message(s) and the actors to receive the message(s) are stored in the alert rules 404.

Providing the alert system in the central processor 22 enables alert rules based on events at more than one controller or site, or based on a comparison between sites or controllers. In addition, alert rules may also make use of information received at the data warehouse external to the controller 12, such as weather or power supply status from the utility responsible for power at the site where the controller is situated.

The central processor 22 is also configured to compare and analyse data in the data warehouse between controllers and sites. This enables comparison of performance between different configurations of controllers in terms of energy efficiency and power utilisation and to assess any differences in the configurations which may be contributing to the performance difference. Such analysis enables optimisation of the controllers 12 across multiple sites to improve the overall energy efficiency of the system 10. In one instance, the central processor 22 compares power usage against the command rules 318 used by each controller to identify whether any rules have been changed by site personnel which may be contributing to the difference in energy performance. The central processor 22 is arranged to communicate messages to a user corresponding to identified differences between a controller 12 and a preferred configuration associated with that controller. In one arrangement, the central processor includes a user interface for presenting such messages to the user.

Where a change in a rule is identified as increasing the energy efficiency of the system, the central processor 22 may produce a new preferred configuration including the current rules from a controller 12 associated with that configuration and stores the new preferred configuration in the data warehouse 20. The central processor communicates the preferred configuration to each controller 12 associated with that configuration along with a command to replace the controller's current configuration data with the preferred configuration data. This enables synchronisation of rules between controllers associated with that configuration.

The invention claimed is:

1. A system for controlling a plurality of power consuming devices, comprising:
   a first node and a second node;
   a gateway that communicates with the first node and the second node, wherein the gateway receives status data from the first node and the second node, and wherein the gateway buffers data from the first node and the second node;
   a controller configured to send command signals to the first node and the second node via the gateway;
   wherein the controller associates the first node with a first region and the second node with a second region, each of the first and second regions representing a physical area and having a target profile associated therewith, wherein the controller comprises a command signal generation unit that determines a first command signal for the first node and a second command signal for the second node based on the associated target profile, wherein the command signal generation unit comprises a rules engine, wherein the first node provides control signals to a corresponding power consuming device in response to the first command signal received from the controller;
   wherein the first command signal is a request for node status data corresponding to the first node, the gateway configured to respond to the first command signal using the buffered data, the command signal generation unit determining the first command signal for the first node based on the node status data; and
   the system further comprising a data warehouse configured to request the node status data and measurement data from the controller and to store the node status data and the measurement data in the data warehouse, wherein the data warehouse comprises a preferred controller configuration comprising rules data used by the rules engine; the controller being associated with the preferred controller configuration in the data warehouse.

2. The system of claim 1, further comprising a central processor that requests current configuration data from the controller.

3. The system of claim 2, wherein the controller is associated with a site identifier in the data warehouse, and wherein the central processor is configured to compare data in the data warehouse between the controller and the site identifier.

4. The system of claim 3, wherein the central processor compares current rules of the controller data against preferred configuration data.

5. The system of claim 3, wherein the central processor compares power usage against rules data.

6. The system of claim 3, wherein the central processor produces a new preferred configuration associated with the controller, wherein the new preferred configuration comprises a current rule from the controller and the central processor stores the new preferred configuration in the data warehouse.

7. The system of claim 3, wherein the central processor communicates the preferred controller configuration to the controller along with a command to replace the current configuration data with preferred configuration data.

8. The system of claim 3, wherein the central processor comprises a second command signal generator unit, the second command signal generator unit comprising a rules engine, the central processor arranged to communicate commands produced by the second command signal generator unit to the controller.

* * * * *